US012486144B2

(12) United States Patent
Fedor et al.

(10) Patent No.: US 12,486,144 B2
(45) Date of Patent: Dec. 2, 2025

(54) METHOD AND APPARATUS FOR CONTROLLING THE LOCATION OF A MOVEABLE CRANE

(71) Applicant: Morgan Engineering Systems, Inc., Alliance, OH (US)

(72) Inventors: Mark L Fedor, Hartville, OH (US); Steve D. Herron, Salem, OH (US)

(73) Assignee: MORGAN ENGINEERING SYSTEMS, INC., Alliance, OH (US)

(*) Notice: Subject to any disclaimer, the term of this patent is extended or adjusted under 35 U.S.C. 154(b) by 407 days.

(21) Appl. No.: 18/149,851

(22) Filed: Jan. 4, 2023

(65) Prior Publication Data

US 2023/0211984 A1 Jul. 6, 2023

Related U.S. Application Data

(60) Provisional application No. 63/296,258, filed on Jan. 4, 2022.

(51) Int. Cl.
*B66C 9/00* (2006.01)
*B66C 9/16* (2006.01)
*B66C 13/30* (2006.01)

(52) U.S. Cl.
CPC ................ *B66C 9/16* (2013.01); *B66C 13/30* (2013.01)

(58) Field of Classification Search
CPC ........... B66C 9/16; B66C 13/30; B66C 13/48; B66C 13/46; B66C 15/065
See application file for complete search history.

(56) References Cited

FOREIGN PATENT DOCUMENTS

| | | | | |
|---|---|---|---|---|
| CA | 2683726 A1 * | 10/2008 | ........... | G01C 15/002 |
| DE | 4416707 A1 * | 11/1995 | ............. | B66C 13/46 |
| DE | 19519741 A1 * | 12/1996 | ........... | B66C 13/085 |
| DE | 102020104050 A1 * | 8/2021 | | |
| JP | H05246687 A * | 9/1993 | ............. | B66C 13/48 |
| JP | 2022185104 A * | 12/2022 | ............. | B66C 13/46 |
| WO | WO-9718153 A1 * | 5/1997 | ........... | B66C 13/063 |
| WO | WO-2013011200 A1 * | 1/2013 | ........... | B66C 13/085 |

* cited by examiner

*Primary Examiner* — Emmanuel M Marcelo
(74) *Attorney, Agent, or Firm* — Sand, Sebolt & Wernow Co., LPA

(57) ABSTRACT

A laser positioning system is used in association with a crane within a manufacturing facility. The laser positioning system includes a laser source that is mounted on an immovable or non-moving wall or surface in the manufacturing facility. The laser source on the wall or surface ensures that the laser beam does not skew out of square relative to the movement of the crane to various locations in the facility.

17 Claims, 10 Drawing Sheets

METHOD AND APPARATUS FOR CONTROLLING THE LOCATION OF A MOVEABLE CRANE

CROSS REFERENCE TO RELATED APPLICATIONS

The present disclosure claims the benefit of U.S. Provisional Patent Application Ser. No. 63/296,258, filed on Jan. 4, 2022, the entirety of which is incorporated herein by reference.

TECHNICAL FIELD

The present disclosure relates generally to apparatus, systems and methods for controlling the position of a moveable crane.

BACKGROUND ART

Manufacturing facilities, building, or structures are often very large. Some facilities, buildings, or structures can be over 3000 feet in length. These facilities, buildings, or structures may have cranes therein that are capable of moving to various locations in order to lift an objects. One exemplary product that can be lifted by an overhead crane in the facility is a large metal coil.

Because the coils are so heavy, special overhead cranes are often used to move the steel coils to load them onto rail cars. There are two manners for controlling these cranes. The cranes may be controlled by a person holding a control device used to control the movement and functionality of the crane. While holding the control device, that person would follow the crane moving a steel coil and that movement may require him to walk on surfaces near the steel coil being moved as well as on catwalks, up stairs and down stairs. Often, this person is looking overhead which can cause them to fall off catwalks, down stairs and/or lose their attention to cause life threatening movement of the crane and the steel coil it is moving.

Another way of controlling the crane is an automatic laser system that positions the crane at a desired location above the object to be lifted. Currently, the lasers are mounted on a portion of the crane, such as a tram or trolley that runs along crane rails or tracks. When the laser is mounted on the tram or trolley, the laser generates a laser beam that is directed towards a reflector mounted on a wall or other fixed surface in the facility. The laser beam directed to the reflector generates a response that is reflected back to an optical receiver in the laser. The laser is then able to determine a distance based on the reflected beam. The distance between the laser and the reflector is used by positioning logic coupled to various motors, rollers, and gears that are controlled by the positioning logic and capable of moving the crane to desired location above an object to be lifted.

SUMMARY OF THE INVENTION

When lasers are mounted on a portion of the crane to obtain a distance relative to a fixed point, it has been determined that the laser can get skewed if the rollers on each side of the crane are not in sync. Namely, there is a tendency for the laser to be skewed out of alignment such that it does not accurately obtain the proper distance. Therefore, a better way of controlling the location of the crane in the facility is desired.

To address this problem, the present disclosure provides an improved laser positioning system for use with an overhead crane in a manufacturing facility. Generally, the apparatus, systems and methods of the present disclosure provide for controlling the location of a moveable trolley or tram on a crane using one or more lasers mounted to a fixed or immovable structure that established a fixed reference to obtain the precise location of the tram, trolley, or other portion of the crane. One specific embodiment of the present disclosure places the laser that generates the laser beam on a fixed and non-moving portion of the facility to eliminate the problem of skewed laser beams when lasers are mounted on the moveable portion of the crane. This embodiment mounts the laser to a wall or other non-moving surface in a building or structure. By doing so, the laser beam can be directed towards the crane to obtain the distance between the laser beam source and the crane without the beam being skewed because the laser beam source does not move. Then, the distance may be provided to the crane positioning logic to effectuate movement of the crane to a desired location in the facility to lift an object.

In one aspect, another exemplary embodiment of the present disclosure may provide a system comprising: a structure having a fixed and non-moving wall or surface; a crane with the structure that moves in first and second directions, and a hoist on the crane that moves in a vertical third direction and the hoist is adapted to lift an object; and a laser positioning system including a first laser source coupled to the fixed and non-moving wall or surface, and wherein the first laser source generates a first laser beam to determine a first distance between the crane and a first reference point. This exemplary embodiment or another exemplary embodiment may further provide logic that sends executable instructions to a processor for controlling one or more motors on the crane to cause the crane to move in at least one of the first and second directions based on the first distance between the crane and the first reference point. This exemplary embodiment or another exemplary embodiment may further provide a second laser source coupled to the fixed and non-moving wall or surface proximate the first laser source, and wherein the second laser source generates a second laser beam to determine a second distance between the crane and a second reference point.

In yet another aspect, another exemplary embodiment of the present disclosure may provide a method comprising: generating a laser beam in a laser source coupled to a non-moving wall in a structure; directing the laser beam to a crane inside the structure; determining with the laser beam a distance between the crane and a reference point; determining whether the crane is at a desired location based on the distance; if the crane is at the desired location, then taking no action; if the crane is not at the desired location, then sending control signals to one or more motors on the crane to move the crane to the desired location. This exemplary embodiment or another exemplary embodiment may further provide continuously monitoring the distance between the crane and the reference point while the crane is moving; and sending a control signal to stop movement of the crane once the crane has reached the desired location.

In yet another aspect, another exemplary embodiment of the present disclosure may provide a system comprising: a structure having a fixed and non-moving wall or surface; rails installed within the structure; a crane within the structure that moves in a first direction above and parallel to at least a portion of the rails, and a hoist on the crane that moves in a vertical direction and the hoist is adapted to lift an object; and a laser positioning system including a first laser source coupled to the fixed and non-moving wall or surface, and wherein the first laser source generates a first laser beam to determine a first distance between the crane and a first point on the crane. This exemplary embodiment or another exemplary embodiment may further provide anti-skew control logic that sends executable instructions to a processor for controlling one or more motors on the crane to cause at least one end of the crane to move in the first direction based on the first distance between the crane and the first point. This exemplary embodiment or another exemplary embodiment may further provide a second laser source in the laser positioning system, the second laser source coupled to the fixed and non-moving wall or surface proximate the first laser source, and wherein the second laser source generates a second laser beam to determine a second distance between the crane and a second point on the crane. This exemplary embodiment or another exemplary embodiment may further provide anti-skew control logic to determine whether the first distance equals the second distance; wherein if the anti-skew control logic determines that first distance does not equal the second distance, then a signal is generated to instruct a motor to move one end of the crane by a differential distance between the first distance and the second distance.

In yet another aspect, another exemplary embodiment of the present disclosure may provide a system comprising: a structure having a fixed and non-moving wall or surface; a crane having a first end and a second end, wherein the crane is within the structure and is moveable in at least a first direction, and a hoist on the crane that moves in a vertical direction and the hoist is adapted to lift an object; and a laser positioning system including: a first laser source mounted to the fixed and non-moving wall or surface, wherein the first laser source generates a first laser beam to determine a first distance between the first laser source and the first end of the crane; a second laser source mounted to the fixed and non-moving wall or surface, wherein the second laser source generates a second laser beam to determine a second distance between the second laser source and the second end of the crane; and anti-skew control logic to determine whether the first distance equals the second distance, wherein if it is determined that the first distance equals the second distance then the crane is classified as square and no action is taken, and if it determined that the first distance differs from the second distance then the crane is classified as skewed and a corrective action is taken to return the crane to square; wherein the corrective action includes a signal generated by the anti-skew control logic to initiate at least one motor on the crane to move one of the first end and the second end of the crane until the first distance equals the second distance. This exemplary embodiment or another exemplary embodiment may further provide wherein the at least one motor is a first motor associated with the first end of the crane; a second motor associated with the second end of the crane; wherein the first motor and the second motor operate independently of each other. This exemplary embodiment or another exemplary embodiment may further provide a continuous operation mode of the first laser source and the second laser source during movement of the crane in the first direction. This exemplary embodiment or another exemplary embodiment may further provide an interval operation mode of the first laser source and the second laser source during movement of the crane in the first direction. This exemplary embodiment or another exemplary embodiment may further provide an interval operation mode of the first laser source, wherein the first distance is measured prior to movement of the crane and subsequent to movement of the crane; and an interval operation mode of the second laser source, wherein the second distance is measured prior to movement of the crane and subsequent to movement of the crane. This exemplary embodiment or another exemplary embodiment may further provide a first reflector mounted near the first end of the crane to reflect the first laser beam to a first receiver at the first laser source; and a second reflector mounted near the second end of the crane to reflect the second laser beam to a second receiver at the second laser source.

In yet another aspect, another exemplary embodiment of the present disclosure may provide a method comprising: generating a first laser beam in a first laser source coupled to a non-moving wall in a structure; directing the first laser beam to a first end of a crane inside the structure; determining with the first laser beam a first distance between the crane and a first point; generating a second laser beam in a second laser source coupled to the non-moving wall in the structure; directing the second laser beam to a second end of the crane inside the structure; determining with the second laser beam a second distance between the crane and a second point; determining whether the crane is square or skewed based on a relationship of the first distance and the second distance. This exemplary embodiment or another exemplary embodiment may further provide if the crane is square, then taking no action; and if the crane is skewed, then a sending control signal to one or more motors on the crane to move the crane until the crane is square. This exemplary embodiment or another exemplary embodiment may further provide determining whether the first distance equals the second distance; if the first distance equals the second distance, then taking no action; and if the first distance differs from the second distance, then a sending control signal to one or more motors on the crane to move the crane until the first distance equals the second distance. This exemplary embodiment or another exemplary embodiment may further provide determining whether the first distance and the second distance are within a differential threshold value relative to each other; if the first distance and the second distance are below the differential threshold value, then taking no action; and if the first distance and the second distance exceed the differential threshold value, then a sending control signal to one or more motors on the crane to move the crane until the first distance and the second distance are below the differential threshold value. This exemplary embodiment or another exemplary embodiment may further provide continuously monitoring the distance between the crane, the first point, and the second point while the crane is moving; and sending a control signal to stop movement of the crane once the crane is square.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The system of the present disclosure is a crane anti-skew system that uses a laser-based positioning system that is not mounted on the crane itself, but instead is mounted on a structure or building in a fixed position instead. One exemplary embodiment of a crane anti-skew system comprises an overhead crane, a building to which a laser beam generator is mounted, at least one laser beam generator on the building (but typically two laser beam generators mounted on the building), at least one reflector on the crane (but typically two reflectors on the crane, where one reflector is associated with or in operative communication with a laser beam from one laser beam generator), and wireless communication logic for transmitting data from a control system, which can be interior or exterior to the building, to the crane.

In operation, the anti-skew system reads laser-based distance values from each end of the crane. The lasers are mounted on the building and functionally point down the runway over top of the runway rails and reflect off targets/reflectors located on the upper footwalks of the crane. These two lasers values are then transmitted to the crane via wireless communication or network logic, such as Industrial Wireless communication protocol.

The crane is equipped with motor(s) on, at, near, or associated with each end. One motor near one end of the crane is the master motor, the other motor is the follower motor. The position feedback from the laser associated on the master motor side will feed directly into the control system for position and feedback. The follower motor side will receive its laser position feedback plus a delta distance or speed determined by the anti-skew control logic calculated based on the difference between the two position lasers. The motors are in operative communication to ensure that the crane remains square relative to the rails below the crane.

Figure 1A:
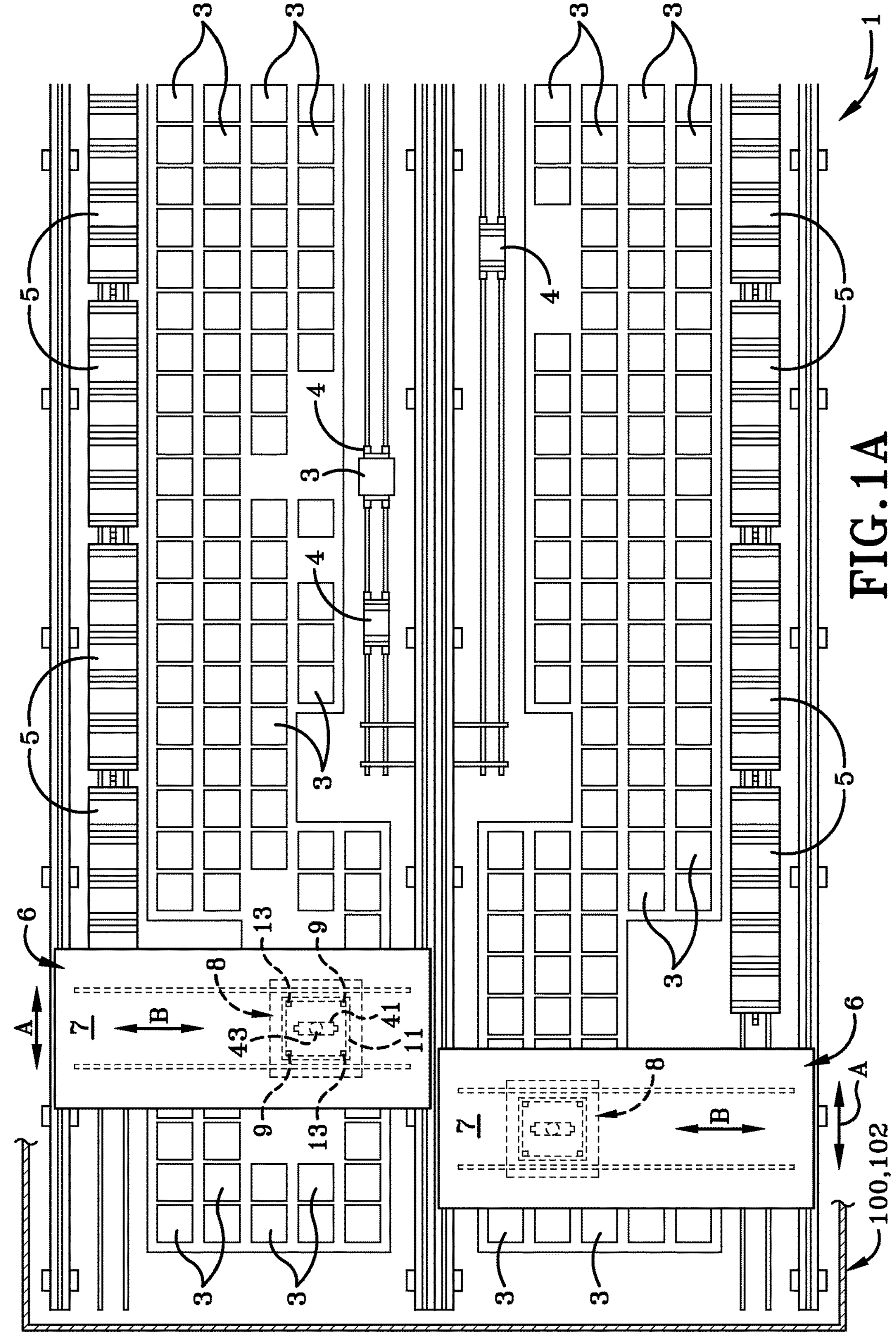
FIG. 1A is a diagrammatic top plan view of a typical coil yard where metal coils are placed after they are produced so that they can cool before they are loaded onto rail cars for transportation.

FIG. 1A illustrates an example coil yard 1 in an immovable facility, building, or structure 100 having a non-moving surface or wall 102. The illustrated coil yard 1 is an indoor coil yard where rolled metal coils 3 are stored after they have been manufactured and are awaiting transport by rail cars 5 that ride along rails. The coil yard 1 is illustrated with four rail cars 5 in an upper portion of the coil yard and four rail cars 5 in a lower portion of the coil yard 1. Three shuttle cars 4 are shown near the middle of the figure. The shuttle cars 4 are configured to bring recently produce rolled coils 3 into the coil yard for cooling. As illustrated in this figure, the cranes 6 have unloaded two of the three shuttle cars 4 and one shuttle car 4 still needs to have its coil 3 unload. In some configurations, the shuttle cars 4 can include global positioning systems (GPSs). The GPS devices can be used to accurately locate where each shuttle car 4 is located so that the cranes know where a shuttle car is located so that it can be unloaded as discussed in greater detail below.

Figure 2:
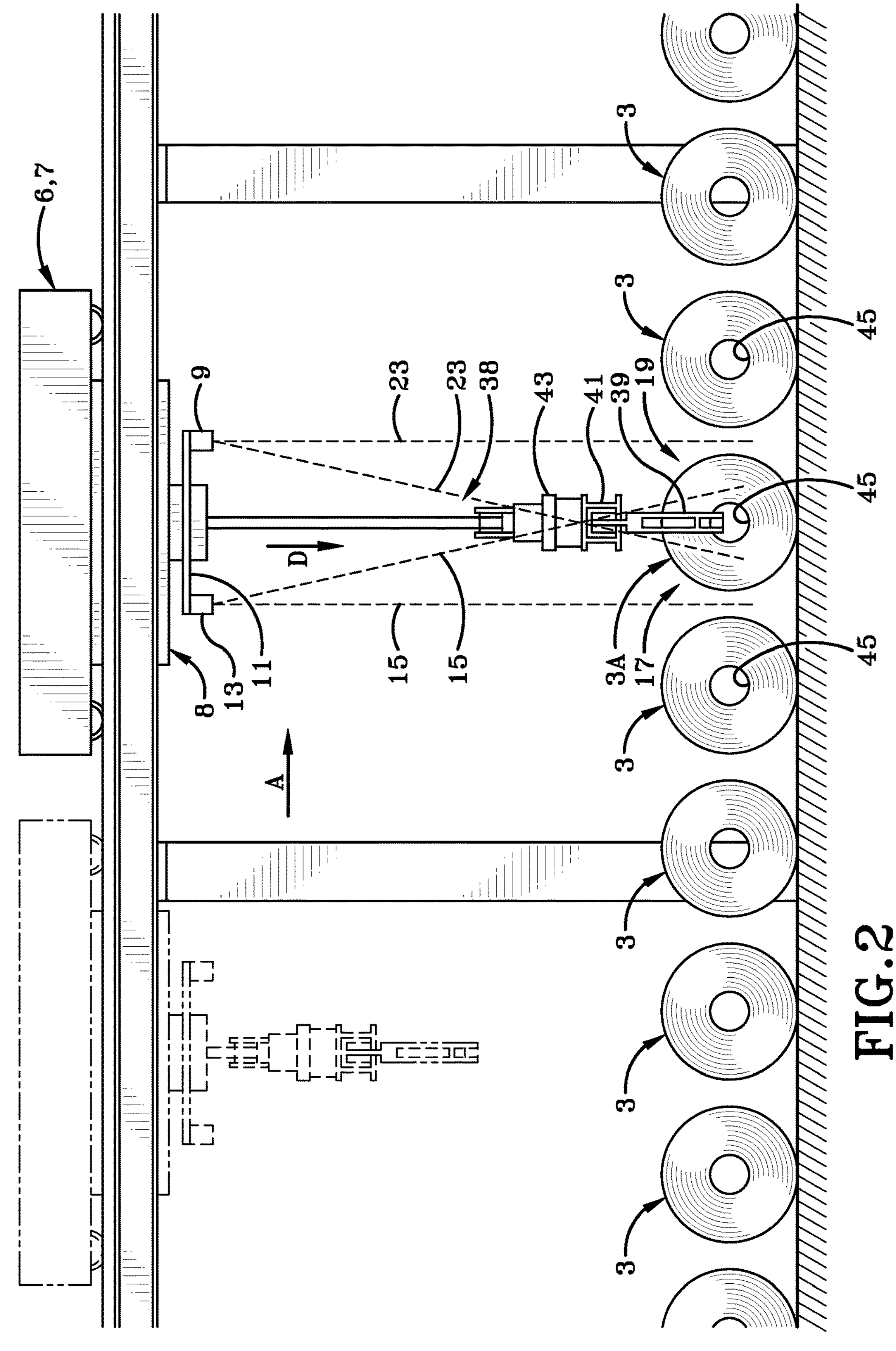
FIG. 2 illustrates an exemplary embodiment of a crane and a hoist with a stereoscopic imaging system used to accurately lift and then place metal coils onto rail cars.
Figure 3:
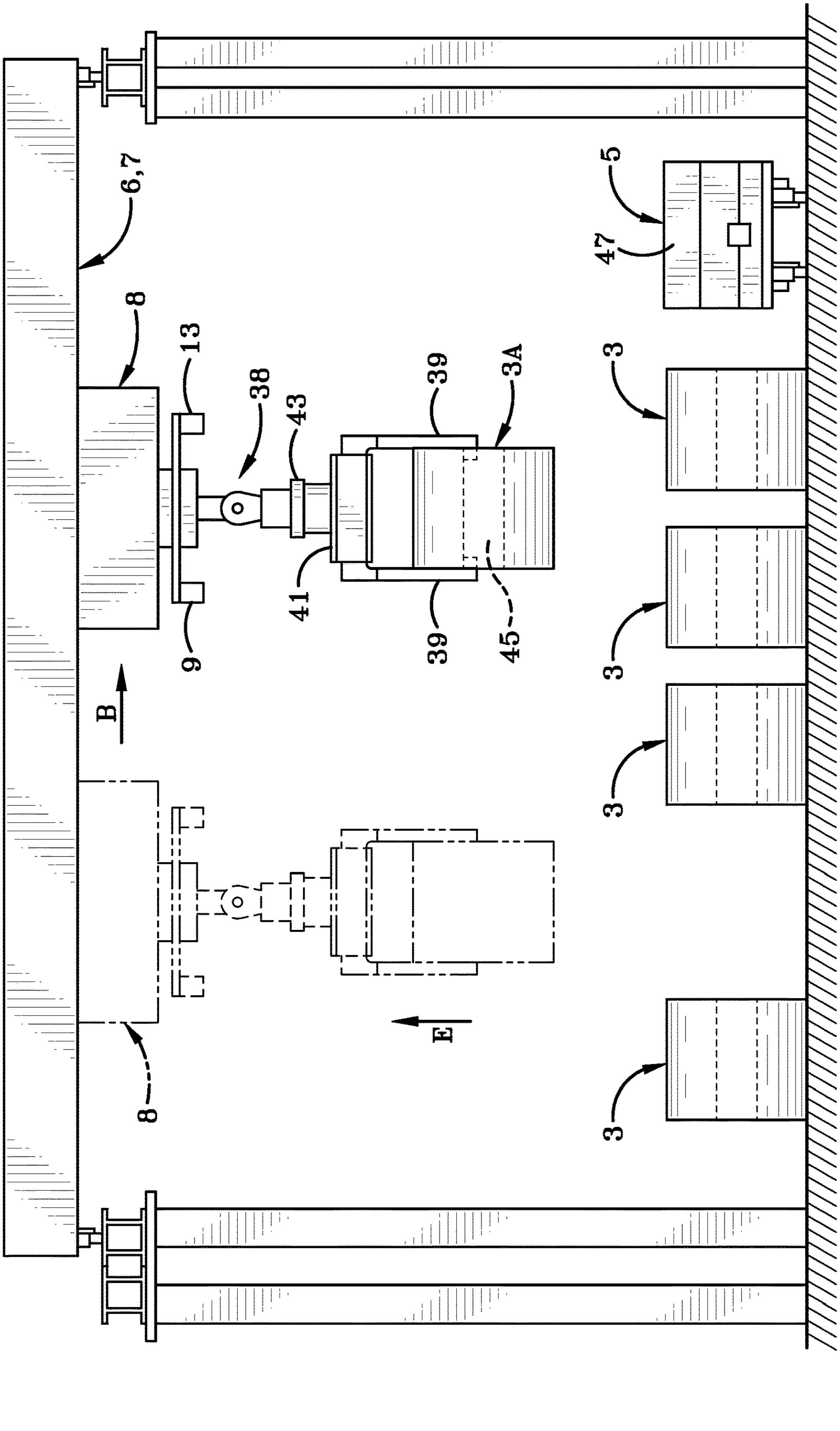
FIG. 3 illustrates further details of an example crane and hoist combination used to move metal coils within a coil yard.

Because the steel coils 3 can be very heavy, custom cranes are often used to pick them up from the coil yard 1 and load them onto a rail car 5. FIG. 2-3 illustrate an example crane 6 that is used to lift steel coils 3 and place them on a rail car 5. Each crane 6 includes an upper portion 7 (also known as bridge 7) and a lower portion 8. The upper portion allows a crane 6 to move a crane hoist 38 (discussed later) in the direction of arrow A (FIGS. 1-2) and the lower portion provides the ability to move the hoist 38 in the direction of arrow B (FIG. 1 and FIG. 3).

Figure 1B:
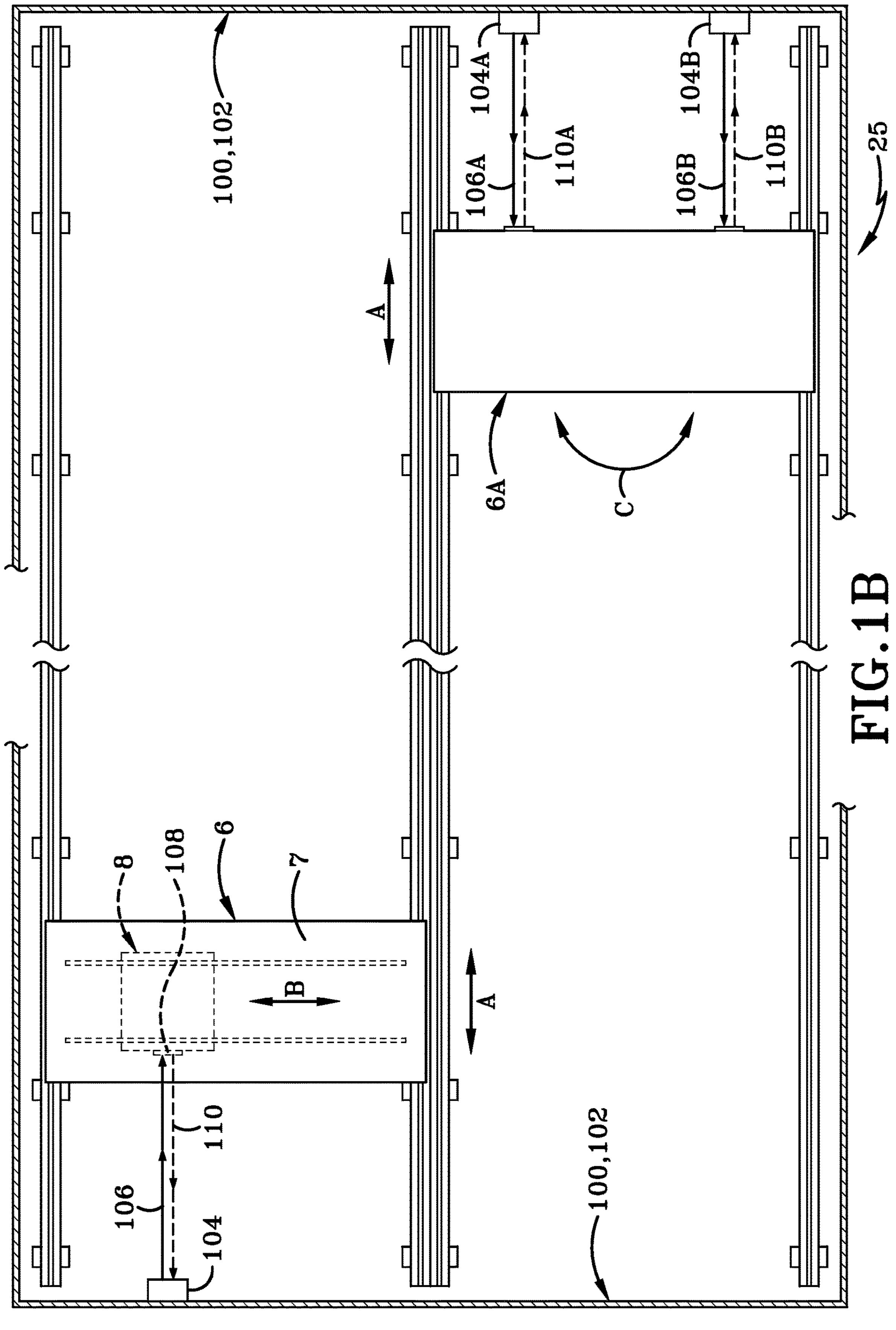
FIG. 1B is a diagrammatic top plan view of a laser positioning system for use with anti-skew control logic to determine whether the crane is skewed or square according to one aspect of the present disclosure.

FIG. 1B depicts a laser positioning system 25 for crane 6. As mentioned previously, the laser positioning system 25 is an anti-skew laser positioning system. Laser positioning system 25 includes a laser source 104 (i.e., a laser beam generator) that generates a beam 106. Laser source 104 is any type of device that generates a laser beam 106 capable of determining a distance between the source 104 and the object to which a distance is determined. The laser source 104 is fixedly mounted to an immovable or non-moving wall 102 of building 100. The laser source 104 generates and directs beam 106 towards a portion of crane 6. In one embodiment, beam 106 is directed to a reflector 108 carried by crane 6. In one embodiment, reflector 108 is coupled with bridge or upper portion 7. In another embodiment, reflector 108 is coupled with lower portion 8. In one specific embodiment, the reflector 108 is mounted below a footwalk on the bridge near one end of the crane. The beam 106 is directed towards reflector 108 and upon contact with the reflector 108, a reflected beam 110 is transmitted back to source 104 that has a receiver to receive the reflected beam 110 to determine the distance between the reflector 108 and source 104. In one embodiment, reflector 108 is a distinct hardware component and in another embodiment, the reflector is simply a reflective property or quality integral to a surface that the laser beam impinges and reflects back as reflected beam 110. Stated otherwise, reflector 108 may simply be a reflecting surface on the crane 6, such as a polished or mirrored surface on the crane.

Laser positioning system 25 determines the distance between the laser source 104 and a portion of crane 6. This distance is utilized by laser positioning system 25 to execute instructions that operatively control movement of the crane 7 in the direction of Arrow A, Arrow B, and/or Arrow C to position ensure that the crane 6 remains square relative to the rails, cars 4, or cars 5. Also, this distance is utilized by laser positioning system 25 to execute instructions that operatively control movement of the crane 6 in the direction of Arrow A, Arrow B, and/or Arrow C to position ensure that the hoist 38 remains above an object to be lifted, such as coil 3. However, any object is lifted by hoist 38 is possible. Particularly, the distance is used to send control signals to one or more motors that control rollers or wheels that move the crane to a desired location.

Because the laser source 104 is mounted on a fixed and immovable or non-moving wall 102 on building 100, the beam 106 does not skew or become "out of square" relative to the crane. This is an improvement over previous laser systems that mounted their laser source on crane 6 but would have a tendency to skew the beam out of square if the rollers on crane 6 do not move perfecting in unison that would result in the crane being skewed relative to the rails. The previous systems were particularly susceptible to beam skewing when building 100 is a large manufacturing facility, such as those that are longer than 1000 feet in length. In these large manufacturing facilities, even slight deviations or skewing of the beam, are magnified based on the size of the structure. The skewed beam over long distances would make it difficult to determine the distance of the crane relative to a reference point, which ultimately results in less accurate control of the crane 6 and hoist 38. Thus, the present disclosure is able to overcome this specific problem by purposefully reversing the mounting location of the laser source 104. Namely, by mounting the laser source 104 on the fixed wall 102 of building 100, the beam 106 is less likely to become skewed relative to its reference point, such as the reflector 108, because it is squarely mounted to wall 102. As a result, this ensures that the crane 6 remains square relative to the rails, cars 4, or cars 5 when the source 104 is mounted to wall 102.

In another embodiment, laser positioning system 25 includes at least two lasers sources (i.e., two laser beam generators) mounted on wall 102. As depicted in FIG. 1B, there may be a first laser source 104A and a second laser source 104B. The first laser source 104A generates first beam 106A that is directed to or near one side of crane 6A. The second laser source 104B generates a second beam 106B that is directed to or near another side of crane 6A. More particularly, the second beam is directed towards the second side of the bridge 7 of crane 6A. The use of two laser beams ensures that crane 6A is square relative to a reference point, such as the rails, cars 4 or cars 5, when the respective reflected beams 110A, 110B are used to determine that the distance between each laser source 104A, 104B and crane 6A are the same. If it is determined that the distance between crane 6A and each laser source 104A, 104B are not the same, then the laser positioning system 25 can send control signals to the motors of crane 6A to slightly move one or more rollers to cause the crane 6A to a squared position as indicated by Arrow C. Crane 6A may have a first motor mounted near a first end of the crane 6A. The first motor may be a master motor. Crane 6A may have a second motor mounted near a second end of the crane 6A. The second motor may be a follower motor. The follower second motor receives control signals to move in response to a delta (i.e., difference) distance measurement of the second beam 106B from the first beam 106A.

In operation, if the first beam 106A defines the distance between the source 104A and reflector 108A is X and the second beam defines the distance between the source 104B and reflector 108B is Y, then the control system instructs the follower second motor to move the second end of the crane by a distance $\Delta$ ($\Delta = X - Y$) to ensure that both ends of the crane 6A remain square to the reference location.

In one exemplary non-limiting embodiment, a pair of stereoscopic cameras 9 are mounted on two corners of a frame 11 mounted to the bottom side of the crane 6. In the preferred embodiment, the stereoscopic cameras 9 need to have the ability to operate in the high temperatures of the coil yard 1 so the cameras 9 should be able to operate up to about 70° C. Two lights 13 are attached to adjacent corners of the frame 11 to provide light for two views captured by each stereoscopic camera 9. The two cameras 9 and the two lights 13 are best seen in relation to one another from the top view of the yard 1 in FIG. 1. As shown in FIGS. 2-3, dashed lines 15 show how the lights 13 light up the left side 17 and the right side 19 of particular coil 3A that the crane 6 is to hoist. The two stereoscopic cameras 9 are mounted so that they can capture images of both the left side 17 and the right side 19 of coil 3A with the focal area as illustrated by dashed lines 23.

In one exemplary embodiment and for the purpose of simplicity, the Figures illustrate a pair of stereoscopic cameras and the Specification discusses a pair of stereoscopic cameras. However, those of ordinary skill in the art can appreciate that in other embodiments of the invention more stereoscopic cameras can be used or only a single stereoscopic camera can be used. Of course, the number of stereoscopic cameras and lighting fixtures can be different and they do not have to be used in equal numbers as illustrated and described in the present Specification. When using multiple stereoscopic cameras, multiple different images may be captured to produce more accurate special images. Likewise, adaptive lighting can be used in different environments and positions that the cameras operate in order to enhance stereoscopic images in ever changing conditions. It is even conceivable that any number of stereoscopic cameras, non-stereoscopic cameras, lighting systems, adaptive lighting systems and the like can be used to implement different embodiments of novel features of this invention.

Figure 4:
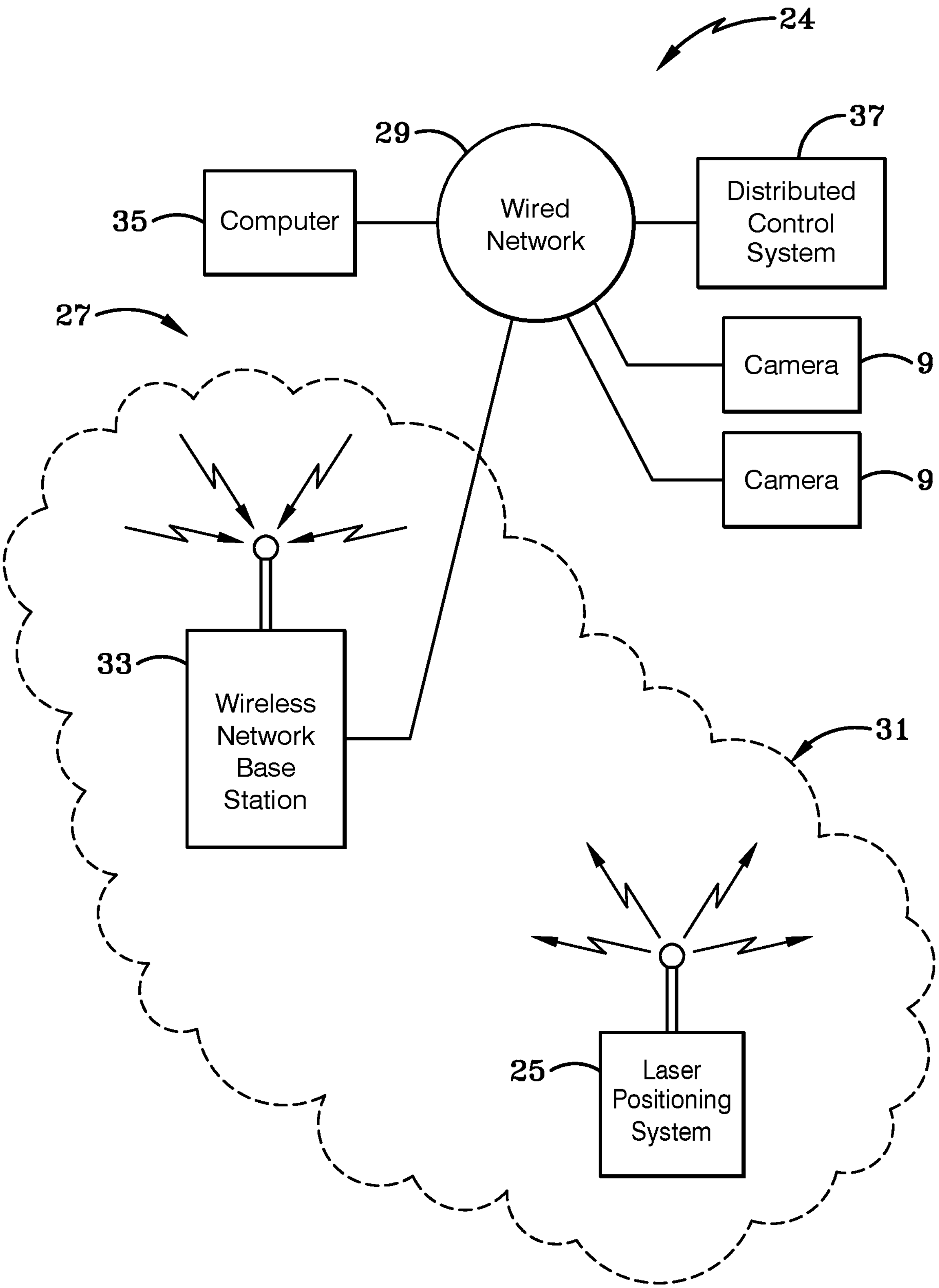
FIG. 4 illustrates an example stereoscopic image processing system for automatically controlling the crane to locate, pick-up and load metal coils onto rail cars.

FIG. 4 illustrates some components of a stereoscopic image processing system 24 for automatically controlling the crane 6 to locate, pickup and load coils 3 onto rail cars 5. System 24 includes a laser positioning system 25 configured to determine the location of the crane. One or more of the crane 6, cameras 9 and laser positioning system 25 can be connected to a communication network 27 that can be any configuration as understood by those of ordinary skill in that art. The network 27 can include wired networks 29 and/or wireless networks 31 set up by one or more wireless base stations 33 or other wireless devices. Additionally, one or more of the crane 6, cameras 9 and laser positioning system 25 can be configured to interact over the network 27 in coordination with a computer 35, a distributed control system (DCS) 37, another electronic logic and/or other electronic devices to determine the positioning of steel coils, saddles in the rail cars 5 and/or other objects as describe further below. For example, the computer 35 can be running video image processing software and algorithms that process images captured by the stereo cameras 9 and determine the position of a crane 6 relative to a steel coil 3A or the saddle of a rail car 5. The DCS can be a traditional Siemens control system such as the SIMATIC PCS 7 or another type of DCS as understood by those of ordinary skill in the art.

As mentioned above, the crane 6 further includes a hoist 38. The hoist 38 includes coil tongs 39, a tong support structure 41 and a rotation package 43. The rotation package 43 is attached to the crane 6 and has a motor for rotating the tong support structure 41 and the pair of coil tongs 39. The tong support structure 41 supports the coil tongs 39 and is configured to move the coil tongs 39 into and out of engagement with steel coils 3.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5A:
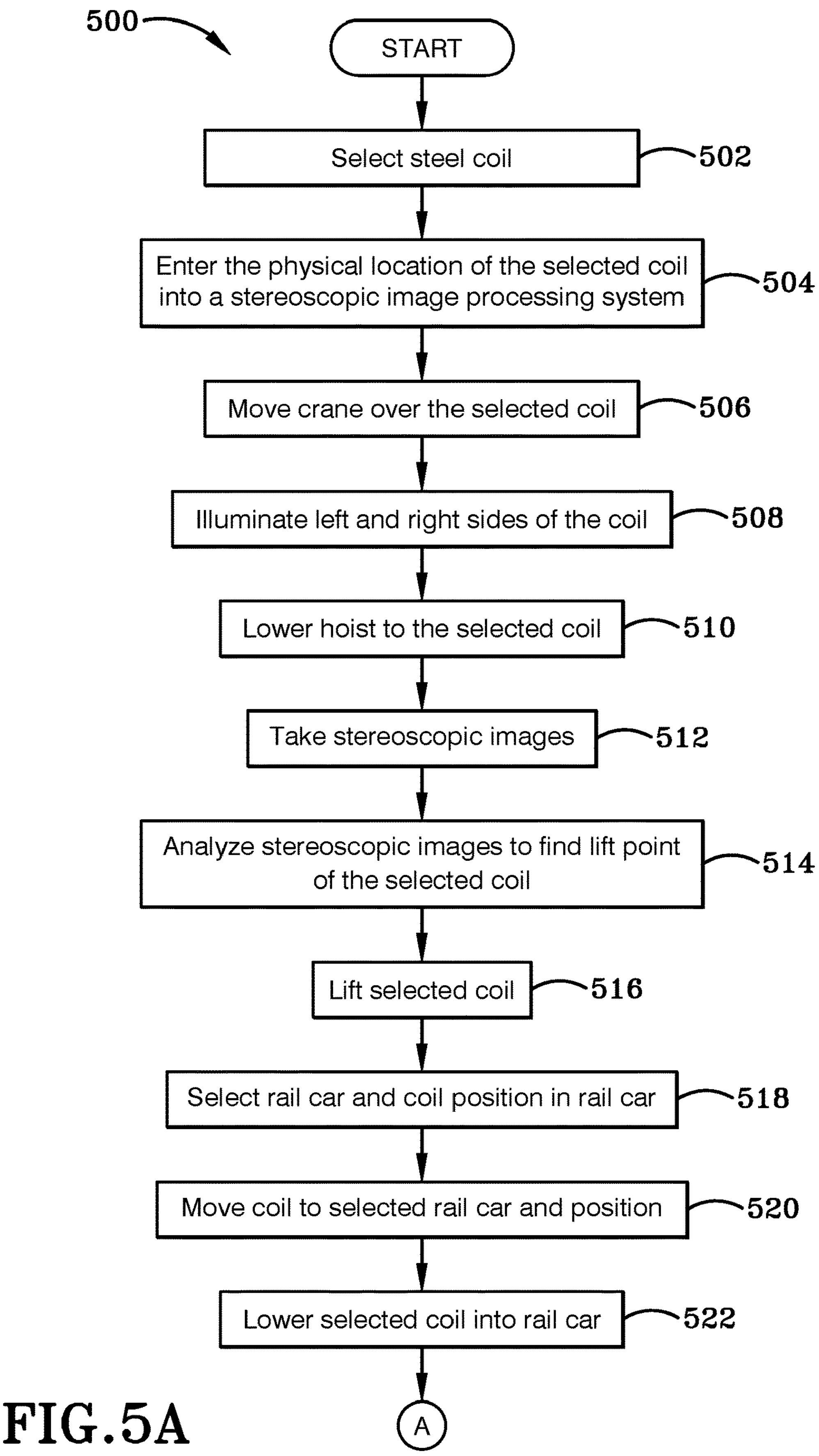
FIGS. 5A-5B illustrate an embodiment of a method for using a stereoscopic image processing system for automatically controlling the crane to locate, pick-up and load metal coils onto rail cars.
Figure 5B:
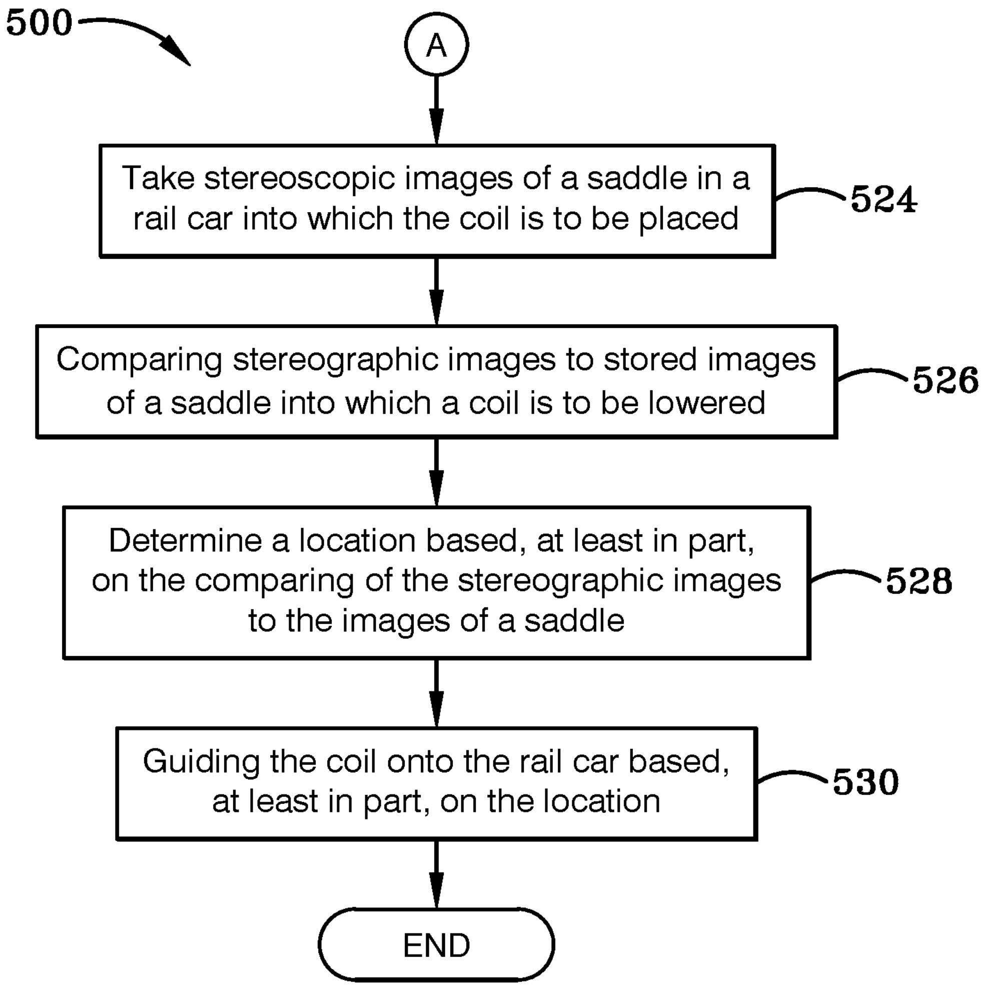

FIG. 5A and FIG. 5B illustrates a method 500 of using one or more pairs of stereoscopic cameras to place steel coils into a rail car. The method 500 begins by selecting a steel coil in a coil yard, at 502, as a selected steel coil 3A for loading onto a rail car 5. In the past, the selected steel coil 3A can then be lifted from the coil yard by manually positioning the crane 6 and hoist 38 over the coil and then manually controlling the hoist to lift the coil 3A. As discussed earlier, this is a hot and dangerous environment so the preferred embodiment of this invention automates this process. In one example embodiment of the preferred embodiment, the method 500 begins by entering data representing a location of the selected steel 3A coil in the coil yard 1, at 504, into the stereoscopic image processing system 24 of FIG. 4.

After the selected coil 3A and its location is known, the method 500 then moves the crane 6 and hoist 38 over the selected coil 3A, at 506. The laser positioning system 25 (FIG. 4) can be used to assist the crane 6 in moving the coil into position and/or lowering the coil into the rail car.

The method 500 can use the stereoscopic image processing system 24 to move the crane 6 and its hoist 38 over the coil 3A. After it is over the coil 3A, the left 17 and right 19 sides of the selected coil 3A can be illuminated, at 508. This allows better stereoscopic images to be taken of the coil 3A. In addition to using stereoscopic imaging, the alternative method 500 can use GPS devices to communicate the location of a shuttle car 4 to the crane 6 and the crane 6 can use this information to move the crane 6 over that particular shuttle car 4. The method 500 can now begin lowering the hoist 38 down in the direction of arrow D in FIG. 2 to the coil, at 510.

Just before and/or while lowering the hoist 38 to the coil the method 500 can begin taking stereoscopic images, at 512, of the left side 17 and right side 19 of the selected coil 3A. In the preferred embodiment, one stereoscopic camera takes pictures of the left side 17 of the coil 3A and a second stereoscopic camera takes pictures of the right side 19 of the coil 3A. A series of stereoscopic images can be taken as the tong support structure 41 and coil tongs 39 are lowered. When the lights 11 and cameras 9 are properly positioned, there while be no light glare so that an image taken of the opening 45 can be processed to determine the bottom surface just inside the opening 45. Once the bottom surface of the opening 45 is determined, these images are analyzed to find the central opening (e.g., eye) 45 of the steel coil, at 514. For example, the stereo images can be analyzed with image analysis software and algorithms running on the computer 35 in the stereoscopic image processing system 24 of FIG. 4. Other ways of analyzing the stereoscopic images can be used as understood by one of ordinary skill in this art.

Figure 6:
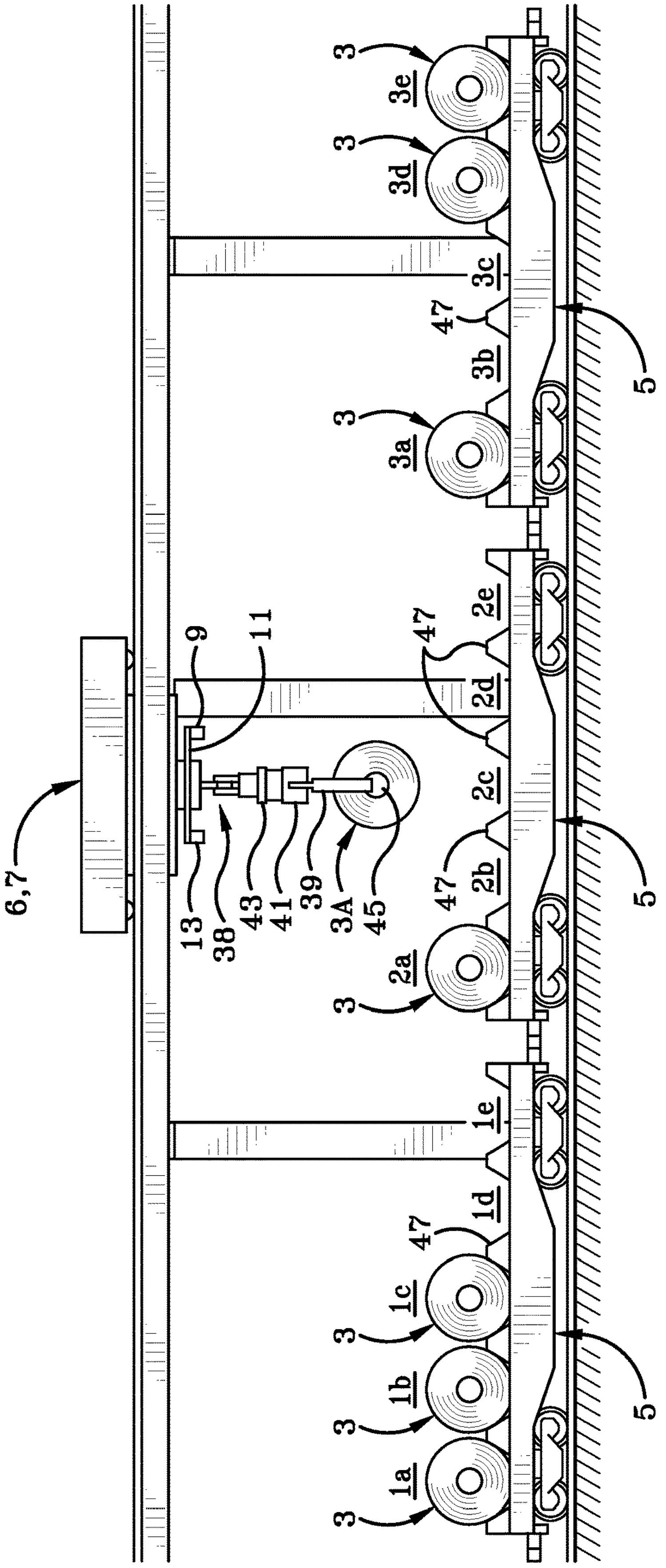
FIG. 6 illustrates an example view of three rail cars and positions for loading metal coils onto the rail cars.

Once the central opening 45 has been found, the hoist 38 is lowered and centered above the selected coil 3A so that pairs of lower arms of the coil tongs 39 can be slid into the central opening 45. The coil 3A is lifted in the direction of arrow E in FIG. 3, at 516, in preparation for transportation to a rail car 5. A rail car 5 and a position in the rail car are selected, at 518, for where the selected coil 3A is to be placed. FIG. 6 illustrates 3 rail cars 5 that can each hold five steel coils. For example, the third position of the second rail car 5 (position "2*c*") can be selected for the destination of the selected coil. The selected coil 3A is then automatically moved overhead by the stereoscopic image processing system 24 to that location, at 520, by the crane 6 above the selected position "2*c*" in the second rail car 5. The method 500 lowers the selected coil 3A downward and into the rail car, at 522.

As the coil 3A is lowered, the method 500 again can begin taking stereoscopic images, at 524. This time, images are taken of the left side and right side of saddles 47 forming a position in the rail car 5 into which the selected coil 3A is being lowered. In the preferred embodiment, one stereoscopic camera 9 takes pictures of the left side of a saddle 47 into which the coil is being lowered and a second stereoscopic camera 9 takes pictures of the right side of a saddle 47 into which the coil is being lowered. In general, five or so different types of rail cars currently exist so once the rail car type is known, its type of saddle used to hold coils loaded into that rail car can be determined. Some rails cars have beam structures used to hold coils and in those cases the beam structures can be determined.

Once the saddle type is determined, a predefined image of that saddle type can be extracted. The method 500 then compares stereograph images to the extracted saddle type, at 526, as the coil 3A is lowered by the hoist 38 toward the selected rail car position "2*c*". The comparisons can be used to calculate and generate a precise position of the coil, at 528, relative to the selected rail car position. Any suitable software, imaging processing algorithm or other logic as understood by those of ordinary skill in the art can be used in determining the position of the coil relative to the selected rail car position. In some configurations, the laser positioning system 25 can also be used to determine the position of the coil. The method 500 can use this location to automatically adjust how the coil 3A is lowered and guided into position "2*c*" in the rail car 5.

In some configurations, the method 500 can determine the location of the coil and/or saddles by first determining the physical location of the cameras. This physical location is then translated into X, Y and/or Z dimensions. For example, the expected location where the coil is to be located in a rail car may be (142', 42'). However, as the coil is lowered, based on the stereographic images and location/position calculations, it may be determined that the X value is really 0.7' larger and the Y value is really 0.5' larger. In this case, the (X, Y) value can be updated to (142.7', 42.5') for subsequent uses.

Figure 5C:
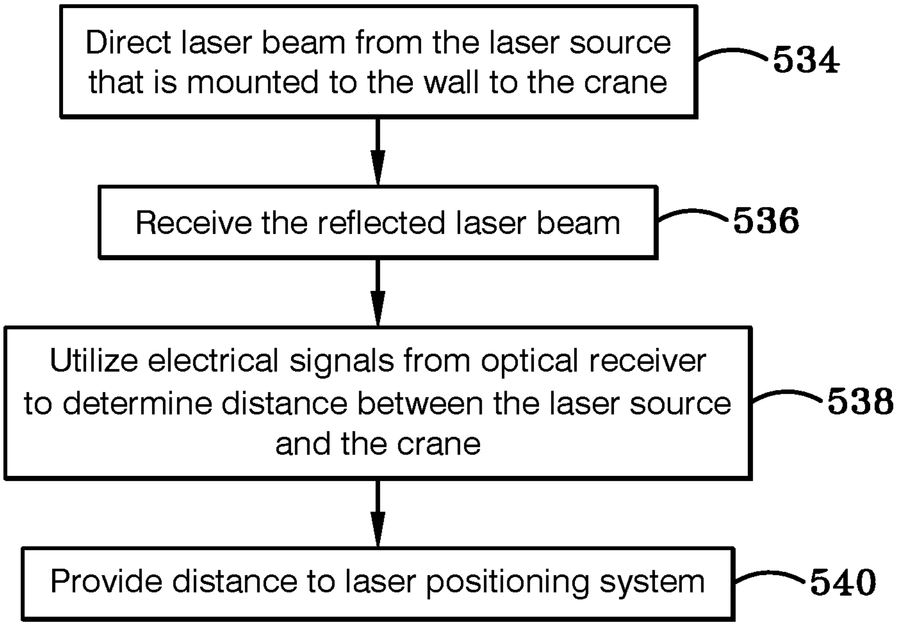
FIG. 5C is a flow chart depicting an exemplary method of determining whether the crane is skewed or square using a laser positioning system and anti-skew control logic according to exemplary embodiments of the present disclosure.

FIG. 5C depicts more specific operation of step 506 in which the laser positioning system 25 is used to assist the crane 6 in moving the coil into position and/or lowering the coil into the rail car. Namely, the laser source 104 is fixedly and immovably mounted or coupled to non-moving wall 102 in building 100. To assist in the moving of crane 6, the distance between the crane and a reference point is to be determined. In one embodiment, the reference point may be the laser source or the wall 102. The laser beam 106 is directed from the source 104 to the crane 6, which is shown generally at 534. In one embodiment, the reflector 108 reflects the reflected beam 110 back to an optical receiver in the laser source 104. The optical receiver receives the reflected beam 110, which is shown generally at 536. The laser positioning system 25 may include distance logic that utilizes signals from the optical receiver to determine the distance between the source 104 and crane 6, which is shown generally at 538. Other embodiments may determine the distance between the crane 6 and a reference point without the use of a reflector 108 and can simply utilize the surface of the crane to reflect the reflected beam 110 that is observed and detected by the optical receiver.

Once the distance between the crane 6 and the reference point is determined, the distance may be sent to the laser positioning system 25, which is shown generally at 540. Then, control signals may be generated in response to the known location of the crane and a known position to where the crane 6 needs to move to pick up the object, such as coil 3. The control signals may be generated by the laser positioning system or another logic.

The laser beam 106 can be a single shot or may be a continuous beam that actively and continuously measures the distance between the crane 6 and the reference point as the crane moves. For example, the distance can first be determined. Then, the laser positioning system 25 may know that the crane 6 needs to move to another location to lift the object. The laser positioning system 25 may send control signals to the motors of the crane that move rollers to effectuate movement of the crane 6. The laser positioning system 25 may continuously monitor the distance between crane 6 and the reference point while the crane 6 is moving. This allows the laser positioning system 25 to send a stop signal to the motors of crane 6 once the crane has reached is desired location above the object. Then, the hoist may be lowered using the imaging system described herein. However, it is noteworthy that the laser positioning system 25 can be used without the imaging system described herein.

Accordingly, the present disclosure can provide a laser positing system 25 that can be retrofitted to an existing crane that does not have an imaging system for hoist 38. Particularly, the laser positioning system 25 can be provided as an after-market kit or system that is provided to a legacy crane. In this scenario, the laser positioning system 25 could be provided and installed in building 100 and integrated to a legacy crane control system.

Another exemplary operation of step 506 in which the laser positioning system 25 having first laser source 104A and second laser source 104B is used to assist the crane 6A in moving the coil into position and/or lowering the coil into the rail car, while also ensuring that the crane that the crane 6A remains square relative to the rails, cars 4, or cars 5 such that the crane 6A does not skew or become out of square, as indicated by Arrow C (see FIG. 1B).

As mentioned previously, crane 6A may have two motors, namely a master first motor and a follower second motor. The motors control movement of wheels, rollers, or similar mechanical components to cause the crane 6A to move in the direction of Arrow A (see FIG. 1B) or Arrow B (see FIG. 1B). If the crane 6A skews, then laser positioning system 25 can be used to send control signals to return the crane 6A to square.

In operation, first laser source 104A generates beam 106A that is directed to reflector 108A on crane 6A. The reflector 108A is associated with the same side of the crane 6A as the master first motor. Reflector 108A may be mounted on a side of the bridge or upper portion 7 near a first end thereof. Distance logic determines the distance between crane 6A and first laser source 104A in response to the reflected beam 110A being received into a receiver at or near first laser source 104A. The distance between crane 6A and first laser source 104A may be referred to as X.

Second laser source 104B generates beam 106B that is directed to reflector 108B on crane 6A. The reflector 108B is associated with the same side of the crane 6A as the follower second motor. Reflector 108B may be mounted on a side of the bridge or upper portion 7 near a second end thereof. Distance logic determines the distance between crane 6A and second laser source 104B in response to the reflected beam 1108 being received into a receiver at or near second laser source 1048. The distance between crane 6A and second laser source 1048 may be referred to as Y.

Anti-skew control logic then determines if X is equal to Y. If it is determine that Y equals X (or is within a selected threshold, such as within 1% of X), then the crane 6A is classified as square or otherwise in a proper position relative to the rails, cars 4 or cars 5. If the anti-skew control logic determines that X is not equal to Y (or outside of the selected threshold), then the crane 6A is classified as skewed. When the crane is classified as being skewed, then the control logic will generate a signal to one or more of the motors to return the crane 6A to square. To generate the signal, the control logic determines the difference between X and Y (i.e., Delta ($\Delta$)=X−Y). Once $\Delta$ is determined, then the control logic coverts the $\Delta$ into an instruction to one of the motors to move one end of the crane by an amount equal to $\Delta$. More particularly, control logic may send a communication signal or instruction, typically wirelessly, to the follower second motor to move the end of crane 6A by a distance equal to $\Delta$ while the master first motor remains inactive so that the other end of the crane 6A remains stationary. As such, the two motors may operate independently of each other when necessary to move one end of the crane. Subsequent to movement of the second end of crane 6A by the distance equal to $\Delta$, then the control logic may repeat the process described herein to confirm that X equals Y. If then X equals Y, then the crane 6A is classified as square. If then X does not equal Y, then the crane remains classified as skewed and the determination of $\Delta$ occurs again in an attempt to return the crane 6A to square.

Depending on application specific needs, the generation of beams 106A, 106B may occur continuously or may occur at intervals (either consistent or inconsistent intervals). For example, it may be more advantageous to use continuous beams to determine the distance between the ends of crane 6A and the sources 104A, 104B if the crane 6A is in a constant state of movement for a period of time. However, if the crane 6A is only moving for short periods of time or on an as-needed basis, then the system 25 may determine the distance between the ends of crane 6A and the sources 104A, 104B when needed to check whether the crane is square or skewed.

Figure 7:
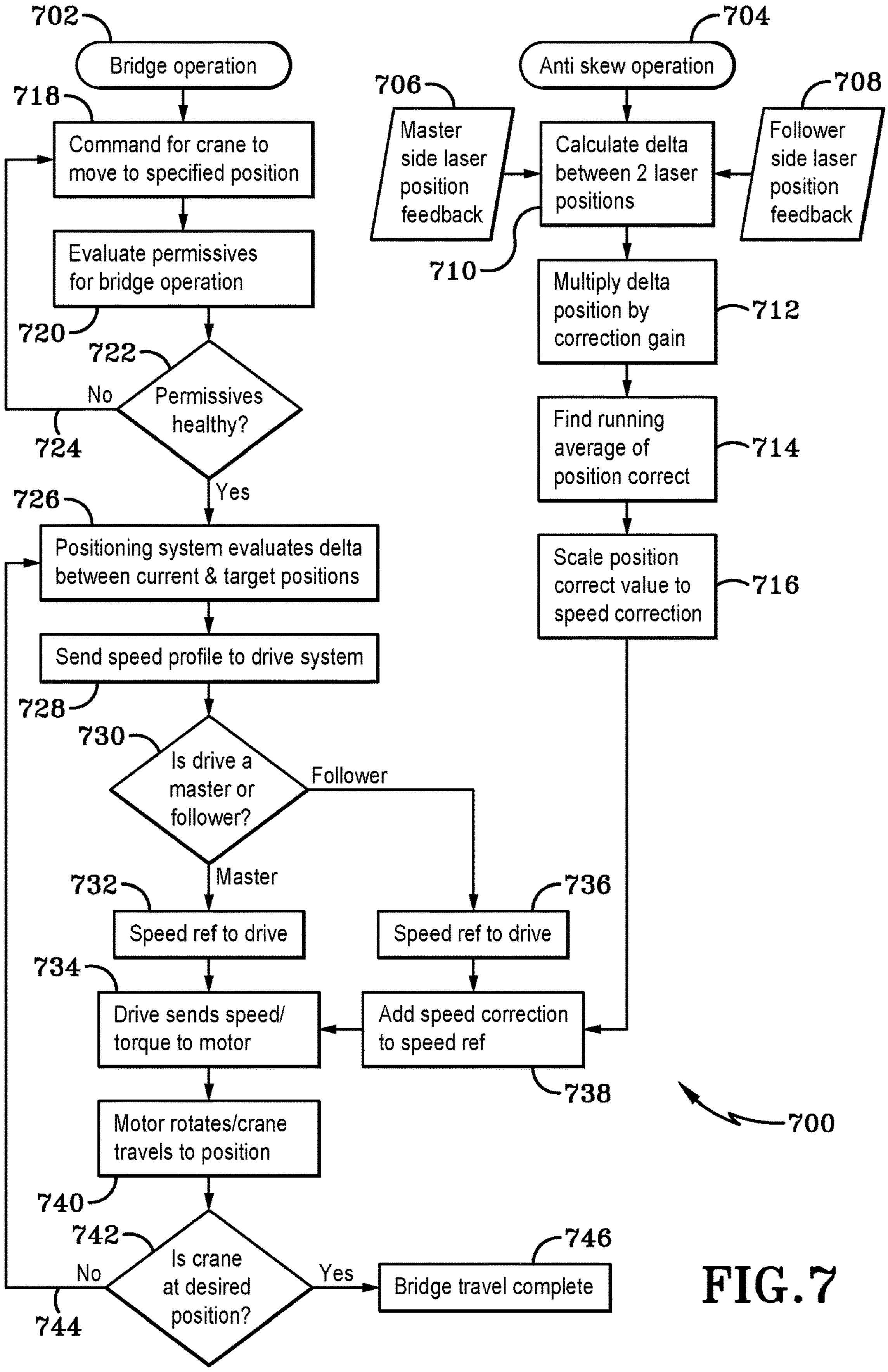
FIG. 7 is a flow chart depicting another exemplary method of determining whether the crane is skewed or square using a laser positioning system and anti-skew control logic according to exemplary embodiments of the present disclosure.

FIG. 7 is a flowchart that depicts an exemplary method according to one aspect of the present disclosure. The method is shown generally as method 700 and includes bridge or crane operations, which is shown generally at 702, and anti-skew operations, which is shown generally at 704. The anti-skew operations 704 obtain the master motor-side laser position feedback at 706 and the follower motor-side laser position feedback at 708. This is accomplished via beams 110A, 110B returning from reflectors 108A, 108B. The feedback 706, 708 is provide to the anti-skew control logic of method 700 to calculate the A between the two laser positions at 710. The anti-skew control logic of method 700 the multiplies the $\Delta$ by a correctional gain at 712. Then, the anti-skew control logic of method 700 finds or determines the running average of position correction at 714. Then, the anti-skew control logic of method 700 uses the running average of position correction to scale the position correction value to speed correlation at 716. The correction value and/or the speed correlation at 716 may then be provided to a portion of the crane operations 702, as discussed later.

The crane operations 702 command the crane to move to a specified position at 718. Then, the method evaluates one or more permissive for crane or bridge operations at 720. The permissive is determined whether it be appropriate or “healthy” or not at 722. If not, then the method repeats and loops back to 718 as indicated by 724. If the permissive is healthy or appropriate, then the method causes the positioning system to evaluate data between the current crane or bridge location and the target position at 726. Then, the method sends or transmits a speed profile to a drive system in operative communication with the master motor and the follower motor at 728.

The method 700 then determines whether the master motor or the follower motor receives the speed profile at 730. If the master motor receives the speed profile, then speed reference or profile is processed by the master motor to drive at 732. The speed reference or profile being processed causes the motor to move to impart torque or rotation to the wheels connected to the motor at 734.

Subsequent to 730, if the follower motor receives the speed profile, then speed reference or profile is processed by the follower motor to drive at 736. Then, the follower motor adds a speed correction to the speed reference or profile at 738 based on the correction value and/or the speed correlation from 716. Thereafter, the output of 738 causes the motor to move to impart torque or rotation to the wheels connected to the motor at 734 that accounts for the correction value and/or the speed correlation from 716.

From 734, the method causes the motor to rotate to cause the crane to travel to a desired position that is square and non-skewed, which is shown generally at 740. From 740, the method determines whether the crane is at a desired position at 742. If the crane is not at desired position, the method repeats and loops back to 726 as indicated by 744. If the crane is at desired position and "square" or not skewed, then bridge or crane travel is complete at 746.

The system 25 of the present disclosure may additionally include one or more sensors to sense or gather data pertaining to the surrounding environment or operation of the system 25. Some exemplary sensors capable of being electronically coupled with components of the system 25 of the present disclosure (either directly connected to the devices, assembly, or components of system 25 of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The system 25 of the present disclosure may include wireless communication logic coupled to one of the aforementioned sensors of the system 25. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly, or system of the present disclosure, the system may use a variety of protocols (e.g., Wifi, ZigBee, MiWi, Bluetooth) for communication. In one example, each of the devices, assemblies, or systems of the present disclosure may have its own IP address and may communicate directly with a router or gateway. This would typically be the case if the communication protocol is WiFi.

In another example, a point-to-point communication protocol like MiWi or ZigBee is used. One or more of the device, assembly, or system of the present disclosure may serve as a repeater, or the devices, assemblies, or systems of the present disclosure may be connected together in a mesh network to relay signals from one device, assembly, or system to the next. However, the individual device, assembly, or system in this scheme typically would not have IP addresses of their own. Instead, one or more of the devices, assemblies, or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the device, assembly, or system of the present disclosure may differ from embodiment to embodiment. In one embodiment, alerts and signals from the device, assembly, or system of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular device, assembly, or system of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used. Alternatively, the gathered data point may be indicated of the alert that will be automatically corrected, for example, by moving one of the motors to return the crane to square if it is skewed.

In other embodiments, alerts and other data from the sensors (which can includes laser sources 104A, 104B) of the system 25 of the present disclosure may also be sent to a work tracking system that allows the individual, or the organization for which he or she works, to track the status of the various alerts that are received, to schedule particular workers to repair or return to square the crane 6 or 6A or another particular device, assembly, or system of the present disclosure, and to track the status of those repair jobs (i.e., wherein a repair job can be the requirement to return the crane to square from being skewed). A work tracking system would typically be a server, such as a Web server, that provides an interface individuals and organizations can use, typically through the communication network. In addition to its work tracking functions, the work tracker may allow broader data logging and analysis functions. For example, operational data may be calculated from the data collected by the sensors on the device, assembly, or system of the present disclosure, and the system may be able to provide aggregate machine operational data for a device, assembly, or system of the present disclosure or group of devices, assemblies, or systems of the present disclosure.

The system also allows individuals to access the device, assembly, or system of the present disclosure for configuration and diagnostic purposes. In that case, the individual processors or microcontrollers of the device, assembly, or system of the present disclosure may be configured to act as Web servers that use a protocol like hypertext transfer protocol (HTTP) to provide an online interface that can be used to configure the device, assembly, or system. In some embodiments, the systems may be used to configure several devices, assemblies, or systems of the present disclosure at once. For example, if several devices, assemblies, or systems are of the same model and are in similar locations in the same location, such as within structure 100, it may not be necessary to configure the devices, assemblies, or systems individually. Instead, an individual may provide configuration information, including baseline operational parameters, for several devices, assemblies, or systems at once.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For example, while the embodiment utilizing two lasers sources 104A, 104B was primarily discussed with both sources 104A, 104B being mounted on the same wall within structure 100. It is entirely possible for one laser source being mounted on a first fixed wall and a second source being mounted on a second fixed wall. In this exemplary embodiment, the system may include a structure or buidling having a first fixed and non-moving wall or surface and a second fixed and non-moving wall or surface, which preferably opposes the first. There can be a crane having a first end and a second end, and a first side and a second side, wherein the crane is within the structure and is moveable in at least a first direction, and a hoist on the crane that moves in a vertical direction and the hoist is adapted to lift an object. There would be a laser positioning system including a first laser source mounted to the first fixed and non-moving wall or surface, wherein the first laser source generates a first laser beam to determine a first distance between the first laser source and the first end of the first side of the crane. There would be a second laser source mounted to the second fixed and non-moving wall or surface, wherein the second laser source generates a second laser beam to determine a second distance between the second laser source and the second end of the second side of the crane. Similarly to the other embodiments, there is anti-skew control logic to determine whether the first distance and the second distance sum to a total value that is indicative of the crane being square. For example, if the total length is calibrated to 1000 feet and the crane is positioned at 200 feet from the first laser source (i.e., the first distance) then the second distance should be 800 feet. Thus, if it is determined that the first distance and the second distance sum to the calibrated "square" distance, then the crane is classified as square and no action is taken, and if it determined that the first distance and the second distance do not sum to the calibrate "square" distance or value, then the crane is classified as skewed and a corrective action is taken to return the crane to square; wherein the corrective action includes a signal generated by the anti-skew control logic to initiate at least one motor on the crane to move one of the first end and the second end of the crane until the first distance and the second distance equal the calibrated square value.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document (DOCX) submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system comprising:

a structure having a fixed and non-moving wall or surface;

rails installed within the structure;

a crane within the structure that moves in a first direction above and parallel to at least a portion of the rails, and a hoist on the crane that moves in a vertical direction and the hoist is adapted to lift an object;

a laser positioning system including a first laser source coupled to the fixed and non-moving wall or surface, and wherein the first laser source generates a first laser beam to determine a first distance between the first laser source and a first point on the crane; and anti-skew control logic that sends executable instructions to a processor for controlling one or more motors on the crane to cause at least one end of the crane to move in the first direction based on the first distance between the first laser source and the first point on the crane.

2. The system of claim 1, further comprising:

a second laser source in the laser positioning system, the second laser source coupled to the fixed and non-moving wall or surface proximate the first laser source, and wherein the second laser source generates a second laser beam to determine a second distance between the second laser source and a second point on the crane.

3. The system of claim 2, further comprising:

wherein the anti-skew control logic determines whether the first distance equals the second distance; and wherein if the anti-skew control logic determines that first distance does not equal the second distance, then a signal is generated to instruct a motor to move one end of the crane by a differential distance between the first distance and the second distance.

4. A system comprising:

a structure having a fixed and non-moving wall or surface;

a crane having a first end and a second end, wherein the crane is within the structure and is moveable in at least a first direction, and a hoist on the crane that moves in a vertical direction and the hoist is adapted to lift an object; and a laser positioning system including:

a first laser source mounted to the fixed and non-moving wall or surface, wherein the first laser source generates a first laser beam to determine a first distance between the first laser source and the first end of the crane;

a second laser source mounted to the fixed and non-moving wall or surface, wherein the second laser source generates a second laser beam to determine a second distance between the second laser source and the second end of the crane;

anti-skew control logic to determine whether the first distance equals the second distance, wherein if it is determined that the first distance equals the second distance then the crane is classified as square and no action is taken, and if it determined that the first distance differs from the second distance then the crane is classified as skewed and a corrective action is taken to return the crane to square; wherein the corrective action includes a signal generated by the anti-skew control logic to initiate at least one motor on the crane to move one of the first end and the second end of the crane until the first distance equals the second distance.

5. The system of claim 4, further comprising:

wherein the at least one motor is a first motor associated with the first end of the crane;

a second motor associated with the second end of the crane;

wherein the first motor and the second motor operate independently of each other.

6. The system of claim 4, further comprising:

a continuous operation mode of the first laser source and the second laser source during movement of the crane in the first direction.

7. The system of claim 4, further comprising:

an interval operation mode of the first laser source and the second laser source during movement of the crane in the first direction.

8. The system of claim 4, further comprising:

an interval operation mode of the first laser source, wherein the first distance is measured prior to movement of the crane and subsequent to movement of the crane; and an interval operation mode of the second laser source, wherein the second distance is measured prior to movement of the crane and subsequent to movement of the crane.

9. The system of claim 4, further comprising:

a first reflector mounted near the first end of the crane to reflect the first laser beam to a first receiver at the first laser source; and a second reflector mounted near the second end of the crane to reflect the second laser beam to a second receiver at the second laser source.

10. A method comprising:

generating a first laser beam in a first laser source coupled to a non-moving wall in a structure;

directing the first laser beam to a first end of a bridge or crane inside the structure;

determining with the first laser beam a first distance between the bridge or crane and a first point;

generating a second laser beam in a second laser source coupled to the non-moving wall in the structure;

directing the second laser beam to a second end of the bridge or crane inside the structure;

determining with the second laser beam a second distance between the bridge or crane and a second point;

determining whether the bridge or crane is square or skewed based on a relationship of the first distance and the second distance.

11. The method of claim 10, wherein determining whether the bridge or crane is square or skewed based on the relationship of the first distance and the second distance further includes:

if the bridge or crane is square, then taking no action; and if the bridge or crane is skewed, then sending a control signal to one or more motors on the bridge or crane to move the bridge or crane until the bridge or crane is square.

12. The method of claim 10, wherein determining whether the bridge or crane is square or skewed based on the relationship of the first distance and the second distance further includes:

determining whether the first distance equals the second distance;

if the first distance equals the second distance, then taking no action; and if the first distance differs from the second distance, then sending a control signal to one or more motors on the bridge or crane to move the bridge or crane until the first distance equals the second distance.

13. The method of claim 10, wherein determining whether the bridge or crane is square or skewed based on the relationship of the first distance and the second distance further includes:

determining whether the first distance and the second distance are within a differential threshold value relative to each other;

if the first distance and the second distance are below the differential threshold value, then taking no action; and if the first distance and the second distance exceed the differential threshold value, then sending a control signal to one or more motors on the bridge or crane to move the bridge or crane until the first distance and the second distance are below the differential threshold value.

14. The method of claim 10, further comprising:

continuously monitoring the distance between the bridge or crane, the first point, and the second point while the crane is moving; and sending a control signal to stop movement of the bridge or crane once the bridge or crane is square.

15. The method of claim 10, further comprising:

multiplying a difference between the first distance and the second distance by a correction gain.

16. The method of claim 15, further comprising:

determining a running average of a positional correction based on a result of multiplying the difference between the first distance and the second distance by the correction gain.

17. The method of claim 16, further comprising:

scaling a position correction value to a speed correlation value to create a scaled value;

providing the scaled value to a follower motor coupled to the bridge or crane;

causing the follower motor to move the bridge or crane.

* * * * *